US010698369B2

(12) United States Patent
Pfeiffer et al.

(10) Patent No.: US 10,698,369 B2
(45) Date of Patent: Jun. 30, 2020

(54) CONTROL DEVICE AND METHOD

(71) Applicant: Siemens Aktiengesellschaft, Munich (DE)

(72) Inventors: Bernd-Markus Pfeiffer, Woerth (DE); Daniel Labisch, Karlsruhe (DE); Felix Pohmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/333,709

(22) PCT Filed: Sep. 14, 2017

(86) PCT No.: PCT/EP2017/073199
§ 371 (c)(1),
(2) Date: Mar. 15, 2019

(87) PCT Pub. No.: WO2018/050779
PCT Pub. Date: Mar. 22, 2018

(65) Prior Publication Data
US 2019/0227498 A1 Jul. 25, 2019

(30) Foreign Application Priority Data

Sep. 16, 2016 (EP) .................................... 16189313
Aug. 9, 2017 (DE) ........................ 10 2017 213 893

(51) Int. Cl.
*G05B 5/01* (2006.01)
*G05B 13/02* (2006.01)
(52) U.S. Cl.
CPC ........... *G05B 5/01* (2013.01); *G05B 13/0205* (2013.01)
(58) Field of Classification Search
CPC .............................. G05B 5/01; G05B 13/0205
See application file for complete search history.

(56) References Cited

U.S. PATENT DOCUMENTS

2013/0090747 A1* 4/2013 Grieb ................ G05B 13/0205
700/28

FOREIGN PATENT DOCUMENTS

EP 2579112 4/2013

OTHER PUBLICATIONS

Stumper Jean-Francois et al. : "Deadbeat Control for Electrical Drives: A Robust and Performant Design Based on Differential Flatness",IEEE Transactions on Power Electronics, Institute of Electrical and Electronics Engineers, USA, Bd. (Year: 2015).*
(Continued)

*Primary Examiner* — Cortez M Cook
(74) *Attorney, Agent, or Firm* — Cozen O'Connor

(57) ABSTRACT

A control device for a process that influences the process via a manipulated variable in accordance with a control deviation between a setpoint and a controlled variable influenced by a disturbance variable, includes a controller that produces the manipulated variable from the control deviation fed to the controller, a controller dead zone element arranged before the controller and which can be activatable/deactivatable via a control apparatus, where the controller dead zone element is deactivated when the control deviation exceeds a first threshold value and reactivated when the control deviation falls below a second threshold value that is less than the first threshold value, and includes an adding element that contains a low-pass filter and preferably a disturbance-variable dead zone element arranged after the low-pass filter and which produces an auxiliary manipulated variable from the disturbance variable and adds the auxiliary manipulated variable onto the manipulated variable.

16 Claims, 5 Drawing Sheets

(56) References Cited

OTHER PUBLICATIONS

International PCT Search Report based on PCT/EP2017/073199 dated Dec. 14, 2017.
Stumper Jean-Francois et al: "Deadbeat Control for Electrical Drives: A Robust and Performant Design Based on Differential Flatness", IEEE Transactions on Power Electronics, Institute of Electrical and Electronics Engineers, USA, vol. 30, No. 8, pp. 4585-4596, XP011574675, ISSN: 0885-8993, DOI:10.1109/TPEL. 2014.2359971, found on Mar. 5, 2015 p. 4587, left column, oaraaraph third-riaht column, oaraaraph fifth; fiaure 2; 2015.

* cited by examiner

CONTROL DEVICE AND METHOD

CROSS-REFERENCE TO RELATED APPLICATIONS

This is a U.S. national stage of application No. PCT/EP2017/073199 filed Sep. 14, 2017. Priority is claimed on EP Application No. 16189313 filed Sep. 16, 2016 and DE Application No. 102017213893 filed Aug. 9, 2017, the contents of which are incorporated herein by reference in their entirety.

BACKGROUND OF THE INVENTION

1. Field of the Invention

The invention relates to a closed-loop control device and to a closed-loop control method.

2. Description of the Related Art

In the closed-loop control of a process, an intervention is made in the process via a manipulated variable in accordance with a control deviation between a reference value (setpoint) and a controlled variable (actual value) to minimize the control deviation. A controller generates the manipulated variable from the control deviation fed into the controller, with the controller controlling the process via a final control element. The controlled variable can be influenced by disturbances. Often a distinction is drawn between a controller output generated by the controller for the final control device and the manipulated variable, via which the final control device acts on the process (system being controlled). This distinction is not made below, i.e., the controller output and manipulated variable are considered equivalent for simplicity.

In technical systems there are applications for closed-loop control systems in which the controlled variable is not meant to be held exactly at the setpoint but, instead, held only within defined limits. An example of this is the buffer-level control system, which is a level control system for a buffer tank in which the level is meant to be maintained within defined limits rather than exactly. The level is controlled via a valve as the final control element in the outflow. The intake constitutes a disturbance. Such closed-loop control systems that use a process-variable dead zone have the advantage that no activity of the final control element occurs within the dead zone, thereby allowing a reduction in the energy consumption and wear of the final control element.

For the purpose of implementing the dead zone, it is known to connect a controller dead zone element in front of the controller. Hitherto, however, this usually caused the control performance to deteriorate because the exact setpoint is achieved only with an offset that is dependent on the dead zone width.

In order to achieve an improvement while reducing control interventions and to achieve a better control behavior, EP 2 579 112 B1 proposes a closed-loop control device in which the controller dead zone element connected in front of the controller can be deactivated and reactivated, where the control deviation fed to the controller is influenced by the controller dead zone when the controller dead zone element is in the active state, and is uninfluenced in the inactive state. The dead zone element is deactivated if the control deviation exceeds a first threshold value (which may equal the dead zone limit), and only reactivated once the control deviation falls below a second threshold value, which is smaller than the first threshold value. Reference is made to EP 2 579 112 B1 for further embodiments and advantages of the known dead zone element.

One disadvantage of the dead zone closed-loop control system is poorer correction of disturbance variables, because the controlled variable must first leave the dead zone to activate the closed-loop control system and counteract the disturbance variable.

SUMMARY OF THE INVENTION

In view of the foregoing, it is an object of the invention to provide a closed-loop control device, and closed-loop control method that solve the problems associated with closed-loop control systems.

This and other objects and advantages are achieved in accordance with the invention by a closed-loop control device for a process, which device is configured to influence the process via a manipulated variable in accordance with a control deviation between a reference value and a controlled variable affected by a disturbance variable, where the device comprises a controller that generates the manipulated variable from the control deviation fed to the controller, a controller dead zone element that is connected in front of the controller and can be activated and deactivated by a control unit, and in the active state of which, the control deviation fed via the controller dead zone element is influenced by a controller dead zone, and in the inactive state is uninfluenced, and which is deactivated if the control deviation exceeds a first threshold value, and is reactivated once the control deviation falls below a second threshold value that is smaller than the first threshold value, and an application element, which contains a lowpass filter and generates from the disturbance variable an auxiliary manipulated variable, which it applies to the manipulated variable.

It is also an object of the invention to provide a closed-loop control method for a process for regulating a controlled variable influenced by a disturbance variable to a reference value within a permitted band of variation, where a controller generates a manipulated variable from the control deviation fed to the controller, a controller dead zone element, which is connected in front of the controller and comprises a controller dead zone for defining the permitted band of variation, is deactivated if the control deviation exceeds a first threshold value, where in the deactivated state the control deviation fed to the controller is uninfluenced by the controller dead zone, and the controller dead zone element is reactivated once the control deviation falls below a second threshold value, which is smaller than the first threshold value, where in the activated state the control deviation fed to the controller is influenced by the controller dead zone, and the disturbance variable is measured and is applied as an auxiliary manipulated variable to the manipulated variable via a lowpass filter.

While the closed-loop control system remains deactivated within the dead zone, a change in the disturbance variable has a direct effect on the manipulated variable, with the result that measurable disturbance variables can be counteracted far more quickly and thus in the best case it is possible to prevent leaving the dead zone. Lowpass filtering of the applied disturbance variable reduces the activity of the final control element and thus prevents numerous small changes or noise in the disturbance variable again resulting in a correspondingly large number of changes in the manipulated variable. The lowpass filter in the manipulated-variable application circuit lies outside the feedback path of the control loop. Consequently, the lowpass filter, has no destabilizing effect on the control loop. The time constant of the lowpass filter must be chosen to be large enough to make noise and small variations in the filtered disturbance variable (or in the auxiliary manipulated variable generated therefrom) no longer noticeable.

A large smoothing factor, however, involves a large delay, which in turn can lessen the intended effect of the disturbance variable application circuit, i.e., a fast/rapid response to disturbances. In addition, a single change in a disturbance can result in a change in the lowpass-filtered disturbance signal, which change, while being slow, lasts longer, which can result in continuous activity of the final control element. In accordance with an advantageous embodiment of the invention, this can be prevented by a disturbance variable dead zone element arranged after the lowpass filter. In combination with a separate dead zone for the disturbance variable, a significantly shorter time constant can be chosen for the lowpass filter. Both the filter action and the time delay are reduced by the shorter time constant. Although the disturbance variable still varies after the lowpass filtering, this variation is less stronger than originally. The disturbance variable dead zone now keeps the value of the disturbance variable application circuit constant as long as the variation in the filtered disturbance variable occurs within the defined limits of the dead zone. Given suitable parameterization of the lowpass filter and of the disturbance variable dead zone, this is the case for the noise and small variations in the disturbance variable during normal operation, and therefore a disturbance variable that is constant on average does not cause any activity in the final control element. The time constant of the lowpass filter should be selected here to be so small that any significant change in the disturbance variable exceeds the dead zone relatively quickly and, hence, takes effect in the disturbance variable application circuit.

In the vast majority of cases, the disturbance variable is on average greater than zero or has a non-zero trend. Consequently, the position of the disturbance variable dead zone must be tracked accordingly. This can be performed by a control unit for controlling the disturbance variable dead zone element, where the control unit compares the current position of the disturbance variable dead zone with the lowpass-filtered disturbance variable for a deviation, and changes this position to the current value of the lowpass-filtered disturbance variable if the deviation exceeds a predetermined amount. In the simplest case, this is achieved, for instance, by changing the position of the disturbance variable dead zone by an amount equal to half the dead zone width if the lowpass-filtered disturbance variable leaves the dead zone. As a result, the current value of the disturbance variable, at this instant, lies in the center of the changed dead zone.

In an advantageous embodiment of the invention, the control units of both dead zone elements are coupled together, where the disturbance variable dead zone element can be also activated and deactivated by its control unit, and is temporarily deactivated if the control deviation leaves the controller dead zone. If the control deviation leaves the controller dead zone, the closed-loop control system becomes active. At this instant, increased activity of the final control element is unavoidable. As a result, the dead zone of the disturbance variable can be deactivated temporarily. Both dead zones can advantageously be deactivated temporarily until the control deviation is very small. By coupling the disturbance variable dead zone to the controller dead zone, the controlled variable can be again returned to the setpoint more quickly, and the manipulated value can be brought back into constant operation more quickly.

If the disturbance variable exceeds its dead zone, the controller dead zone can likewise be deactivated temporarily. It is thereby possible to prevent leaving the controller dead zone by preventatively bringing the controlled variable back close to the setpoint. On the other hand, this also generally results in more frequent changes in the manipulated variable. Coupling the controller dead zone to the disturbance variable dead zone can make sense in certain cases but generally results in more activity of the final control element.

The closed-loop control device in accordance with the invention can advantageously be part of a buffer-level control system, in which the level measured in a buffer tank is used as the controlled variable, the measured intake into the buffer tank is used as the disturbance variable, and the outflow from the buffer tank is used as the variable to be manipulated.

Another advantageous application, for example, is regulating the pH value of a medium in a container by metered addition of a neutralizing agent, where the pH value measured in the outflow from the container is used as the controlled variable y, the pH value measured in the intake is used as the disturbance variable, and the metering of the added neutralizing agent is used as the variable to be manipulated.

Examples of other applications are:

i) Temperature regulation in a stirred-tank reactor having a heating/cooling jacket, in which either superheated steam or cooling water is added for temperature control. The controlled variable is the temperature inside the stirred-tank reactor and, in the case of a cascade control system, the temperature of the heating/cooling jacket. The feed rates of the main reactants added to the reactor are the disturbance variables. ii) Regulating product humidity and product temperature by adjusting the amount of hot air and the temperature in a fluidized bed dryer. Here, measurable disturbance variables are the humidity and the flow rate of the raw material to be dried and, if applicable, the air humidity of the fresh air that is drawn in. Dead zones for the temperature and humidity are common in this application because they correspond to a defined specification range for the product quality. iii) Temperature regulation at the top and bottom of a fractionating column by defining setpoints for underlying flow controllers for hot vapor and return. The intake flow rate to the column is the disturbance variable. Dead zones for the temperature are common in this application, because they correspond to a defined specification range for the product quality (for instance, an alcohol content of 39 to 41% in schnapps distillation).

The closed-loop control method that can be performed using the closed-loop control device is preferably implemented in software or a combination of software/hardware, and therefore the invention also relates to a computer program comprising program code instructions that can be executed by a computer in order to implement the method. In this context, the invention also relates to a computer program product, in particular to a data storage medium or a memory medium, containing the computer program that can be executed by a computer. The computer program is preferably part of an automation device that implements the closed-loop control device, or is held in a memory of the automation device or can be loaded into this memory so that, during operation of the automation device, this computer program automatically performs the method for controlling the level in a buffer tank.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below using examples and with reference to the figures in the drawing, in which.

DETAILED DESCRIPTION OF THE EXEMPLARY EMBODIMENTS

Figure 1:
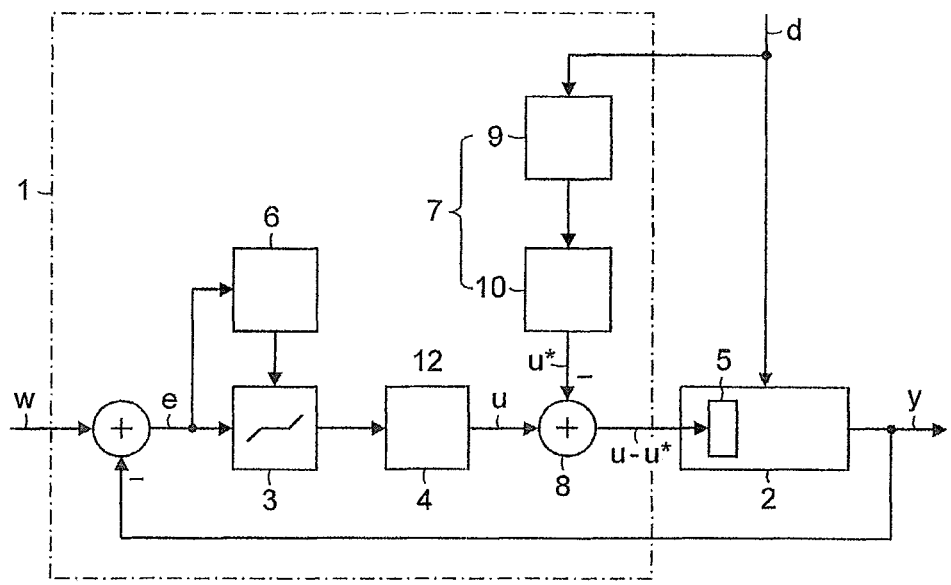
FIG. 1 is a block diagram of an exemplary embodiment of the closed-loop control device in accordance with the invention.

FIG. 1 shows the block diagram of a closed-loop control device 1 for controlling a controlled variable y in a process 2. The actual value (measured value) of the controlled variable y is compared with a reference value (setpoint) w. A control deviation e, which is calculated as the difference between the reference value w and the actual values of the controlled variable y, is fed via a controller dead zone element 3 to a controller 4, which generates a manipulated variable u from the control deviation e and uses this manipulated variable to control the process 2 via a final control element 5. The controlled variable y is affected by a disturbance variable d, which is measurable in this case and acts on the process.

The controller dead zone element 3 is established in accordance with the dead zone element known from EP 2 579 112 B1, which was cited in the introduction, and is set by parameterization to a permitted band of variation for the controlled variable y. In other words, the controlled variable y is meant to be held only within defined limits rather than controlled exactly at the setpoint w. As described in EP 2 579 112 B1, the controller dead zone element 3 is provided with a control unit 6 for its automatic activation and deactivation, where the control deviation e fed to the controller 4 is influenced by the controller dead zone when the controller dead zone element 3 is in the active state, and is uninfluenced in the inactive state. The controller dead zone element 3 is deactivated automatically by the control unit 6 if the control deviation e exceeds a first threshold value, and reactivated once the control deviation e falls below a second threshold value, which is smaller than the first threshold value.

The dead zone closed-loop control system results in poorer correction of changes in the disturbance variable d, because the controlled variable y must first leave the process-variable dead zone or the control deviation e must first leave the controller dead zone in order to activate the closed-loop control system and counteract the disturbance variable d. Therefore, in an application element 7, an auxiliary manipulated variable u* is generated from the measured disturbance variable d and applied to the manipulated variable u. This can be performed via an internal disturbance variable application circuit of the controller 4 or, as shown here, in an adder 8 connected to the output of the controller 4. The controller 4 shown here shall be understood in particular in the sense of the actual control function, such as a P control function or PI control function. Taking a wider view, a controller comprises all the functions that contribute to generating the manipulated variable u from the control deviation e, and thus, for instance, includes the controller dead zone or limitation of the manipulated variable. The adder 8 must then lie, with regard to the anti-windup logic of the controller, before the limitation of the manipulated variable, in order to limit the total manipulated variable u–u* correctly and for the control algorithm to detect when the limits are reached. The application element 7 contains a correction element 9 and a lowpass filter 10.

The correction element 9 is used to take account of a possible nonlinearity in the effect of the disturbance variable d on the controlled variable y. The correction can be made via a characteristic curve, which has been determined in advance empirically, such as by setting different disturbance variable values and determining the associated manipulated variable values (including the applied auxiliary manipulated variable) that are needed to keep the controlled variable fairly consistent with the disturbance variable values set in each case.

The lowpass filter 10 is used for smoothing the disturbance variable d, which may have been corrected, so that noise and small variations in the filtered disturbance variable or in the auxiliary manipulated variable u* are no longer noticeable.

Figure 2:
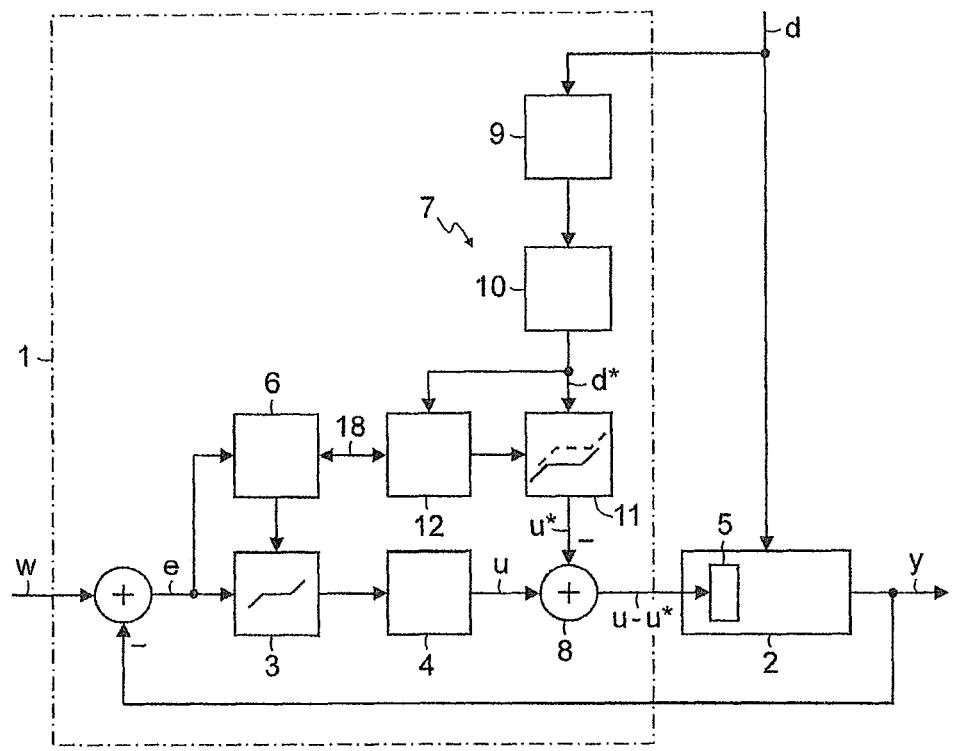
FIG. 2 is a block diagram of another exemplary embodiment of the closed-loop control device in accordance with the invention comprising a disturbance variable dead zone element.

FIG. 2 shows another exemplary embodiment of the closed-loop control device 1, which differs from the example shown in FIG. 1 in that a disturbance variable dead zone element 11 is connected after the lowpass filter 10. The disturbance variable dead zone element 11 is used to keep the value from the disturbance variable application circuit constant as long as the noise and the variations in the filtered disturbance variable d* occur within the limits of the disturbance variable dead zone. The time constant of the lowpass filter 10 can thus be selected to be relatively small to reduce the time delay associated with the lowpass filtering and the consequently slower response of the disturbance variable application circuit to disturbances. Thus, while noise and small variations in the disturbance variable d occur within the disturbance variable dead zone during normal operation, and therefore the value from the disturbance variable application circuit remains constant, a significant change in the disturbance variable d results relatively quickly in the disturbance variable dead zone being exceeded and takes effect in the disturbance variable application circuit.

For larger changes in the disturbance variable d, the position of the disturbance variable dead zone is tracked accordingly in order for the disturbance variable d to lie on average within the disturbance variable dead zone. This is done by controlling the disturbance variable dead zone element 11 via an additional control unit 12, which compares the current position, such as the center, of the disturbance variable dead zone with the lowpass-filtered disturbance variable d*, and changes the position to the current value thereof if the deviation exceeds a predetermined amount.

Figure 3:
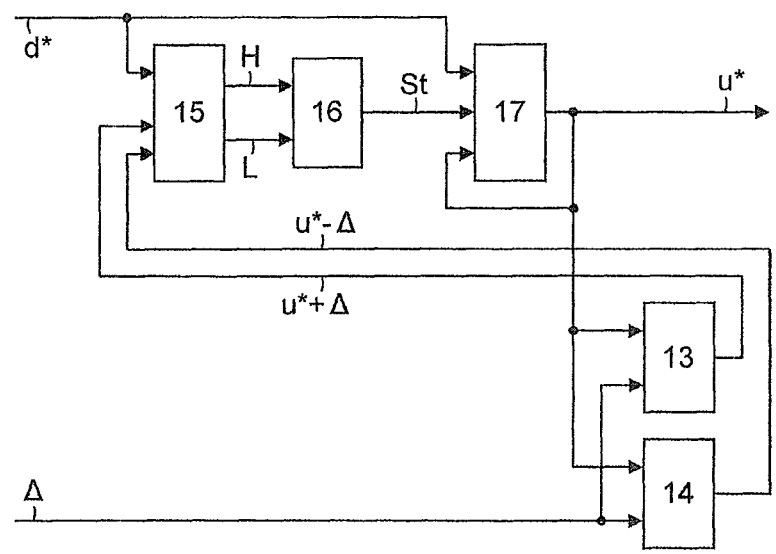
FIG. 3 shows an exemplary adaptation of the position of the disturbance variable dead zone with regard to disturbance variable changes in accordance with the invention.

FIG. 3 shows an exemplary adaption of the position of the disturbance variable dead zone to the disturbance variable in a simplified form of a signal flow diagram in the graphical programming language CFC (Continuous Function Chart). In an adder 13, a value Δ equal to half the width of the disturbance variable dead zone is added to a saved value of the lowpass-filtered disturbance variable d*, where the value is currently output as the auxiliary manipulated variable u*, and is subtracted from the auxiliary manipulated variable u* in a subtractor 14. The sum u*+Δ formed thereby is the upper limit, and the difference u*−Δ is the lower limit of the current disturbance variable dead zone. In a comparator 15, the lowpass-filtered disturbance variable d* is compared with each of the two dead zone limits u*+Δ and u*−Δ. For the two comparisons, the comparator 15 generates two output signals H and L, which both have the logic value "0" when the lowpass-filtered disturbance variable d* lies within the current disturbance variable dead zone, and each assume the logic value "1" when the lowpass-filtered disturbance variable d* exceeds the limit in question (for example, exceeds the lower limit by dropping below it). An OR gate 16 produces a control signal St of value "1" as soon as one of the two dead zone limits is exceeded, thereby controlling a selection element 17 which, in the event of a limit being exceeded, replaces the value of the auxiliary manipulated variable u* that has been output until then with the current value of the lowpass-filtered disturbance variable d*.

Returning to FIG. 2, the control units 6, 12 of the two dead zone elements 3, 11 are coupled together (coupling 18) so that they can have reciprocal control. If the controlled variable e leaves the controller dead zone, the closed-loop control system becomes active, resulting in increased activity of the final control element. Therefore, in this case, the additional control unit 11 deactivates the disturbance variable dead zone temporarily. In addition, both dead zones can be deactivated temporarily until the control deviation e is very small. By coupling the disturbance variable dead zone to the controller dead zone, the controlled variable y can be again returned to the setpoint w more quickly, and the value of the manipulated variable u−u* can be brought back into constant operation more quickly.

In certain cases, conversely, if the disturbance variable d* exceeds its dead zone, the controller dead zone can also be deactivated temporarily to bring the controlled variable y back close to the setpoint w preventatively and to prevent the control deviation e leaving the controller dead zone.

Figure 4:
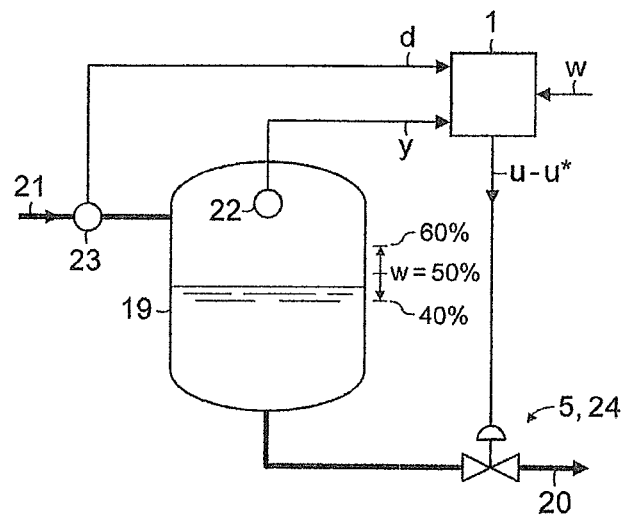
FIG. 4 shows an exemplary closed-loop control device in accordance with the invention as a component of a buffer-level control system.

FIG. 4 shows the closed-loop control device 1 as a component of a buffer-level control system, in which a container (e.g., a tank) acts as a buffer tank 19 in a system (not shown further), in order to achieve in an outflow 20 an outflow rate that is as constant as possible despite a varying flow rate in an intake 21. The amount contained in the tank 19 is also meant to be held between, for example, 40% and 60% of full capacity. In order to regulate the level, the current value of the level, as the controlled variable y, is detected by a level transducer 22 and compared in the closed-loop control device 1 with a predetermined level setpoint w, such as 50% of full capacity. In addition, a flow transducer 23 is used to measure the tank intake, which is used for the disturbance variable application circuit in the closed-loop control device 1. The volume flow rate in the outflow 20 is adjusted via a control valve 24 forming the final control element 5.

Figure 5:
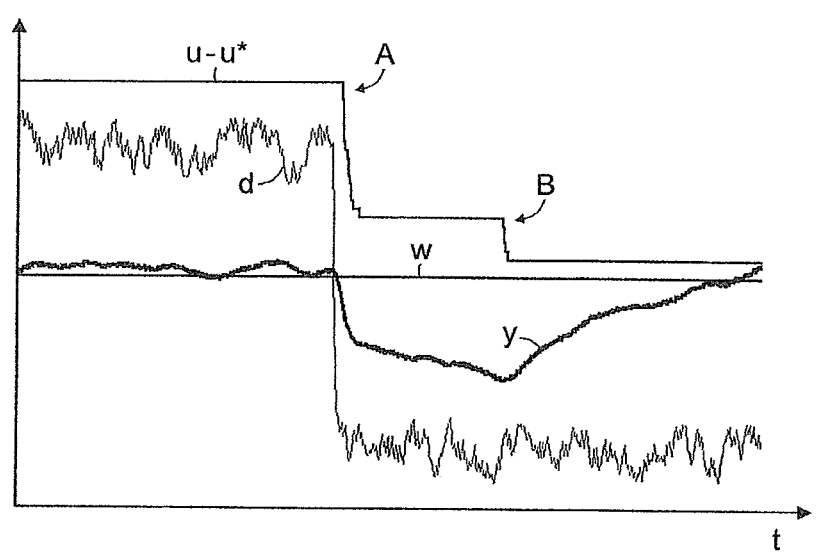
FIG. 5 shows an exemplary adaptation of the position of the disturbance variable dead zone with regard to disturbance variable changes in accordance with the invention.

FIG. 5 shows, by way of example, the variations over time t of the level as the controlled variable y, of the level setpoint w, of the noisy flow into the tank as the disturbance variable d, and of the position of the control valve 24, in other words of the manipulated variable u−u*. The closed-loop control is performed with a controller dead zone of +/−15% about the setpoint w and using the disturbance variable application circuit in accordance with the invention with a disturbance variable dead zone of +/−7% about the currently saved value from the disturbance variable application circuit. The figure shows that for a disturbance variable step-change (for constant setpoint w), the valve position remains extremely constant over long time segments. The valve 24 quickly follows the step-change in the disturbance variable (position A), and the level y remains within the controller dead zone of +/−15%. The valve position remains constant at first, but a short time later (position B) is adjusted again because the disturbance variable d exceeds the limit of the disturbance variable dead zone.

Figure 6:
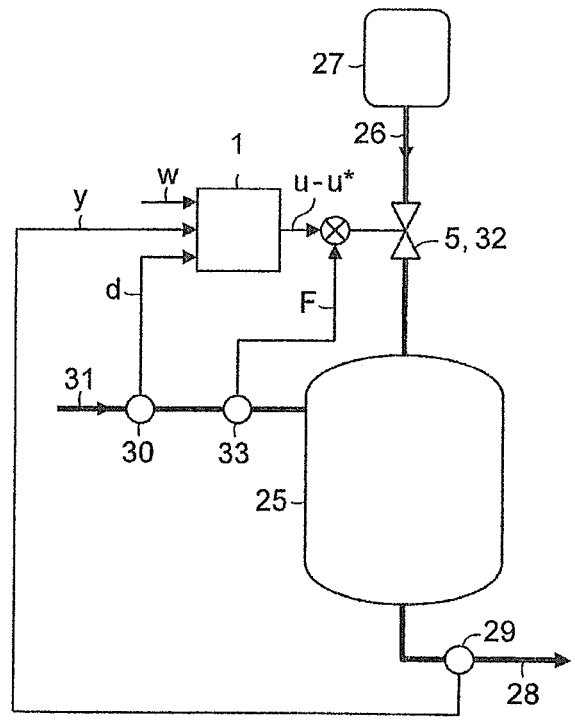
FIG. 6 shows an exemplary closed-loop control device in accordance with the invention as a component of system for regulating a pH value.

FIG. 6 shows the closed-loop control device 1 as a component of a system for regulating the pH value of a medium in a container 25 by metered addition of a neutralizing agent 26 from a storage vessel 27. The pH value measured in the outflow 28 from the container by a measuring probe 29 forms the controlled variable y. The pH value measured in the intake 31, likewise by a measuring probe 30, is the disturbance variable d. The final control element 5 is a control valve 32 for metering the added neutralizing agent 26. The manipulated variable u−u* generated by the closed-loop control device 1 is multiplied by the flow rate F in the intake 31, where the flow rate is measured by a flowmeter 33, before being input to the final control element 5. In order to prevent unnecessary valve movements, the pH value of the medium in the outflow 28 is allowed to vary within a dead zone about the setpoint w.

Figure 7:
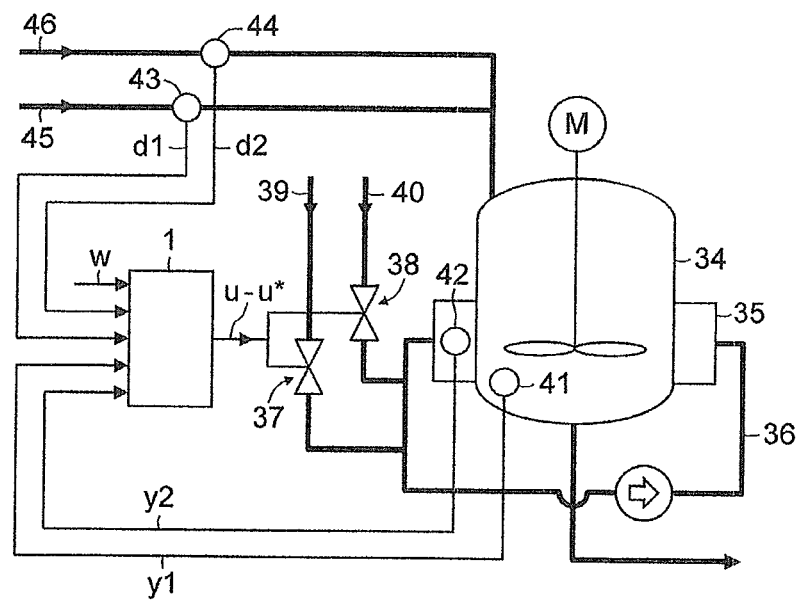
FIG. 7 shows an exemplary closed-loop control device in accordance with the invention as a component of a system for regulating the temperature of a stirred-tank reactor.

FIG. 7 shows the closed-loop control device 1 as a component of a system for regulating the temperature of a stirred-tank reactor 34 having a heating/cooling jacket 35. The temperature is controlled by a temperature-control circuit, to which is added either superheated steam 39 or cooling water 40 via controllable valves 37, 38. The closed-loop control device 1 is configured as a cascade control system and receives as controlled variables y1, y2 the temperatures measured by temperature sensors 41, 42 inside the stirred-tank reactor 34 and in the heating/cooling jacket. Disturbance variables d1, d2 are the feed rates of the main raw materials measured by flow transducers 43, 44 in the intakes 45, 46.

Figure 8:
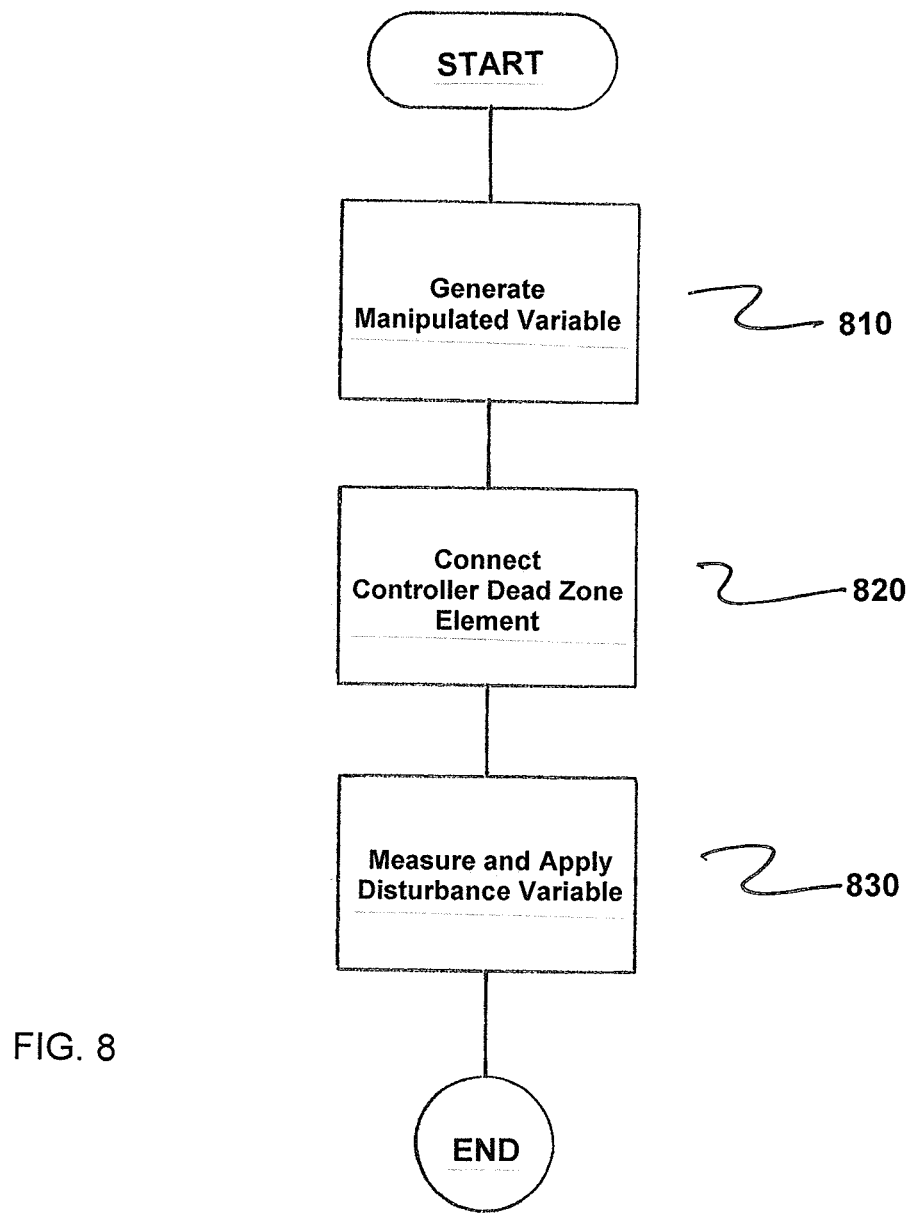
FIG. 8 is a flowchart of the method in accordance with the invention.

FIG. 8 is a flowchart of a closed-loop control method for a process 2 for regulating a controlled variable y influenced by a disturbance variable d to a reference value w within a permitted band of variation. The method comprises generating, by a controller 4, a manipulated variable u from the control deviation e which is fed to said controller, as indicated in step 810.

Next, a controller dead zone element 3 is connected in front of the controller 4, as indicated in step 820. In accordance with the method of the invention, the controller dead zone element 3 comprises a controller dead zone for defining the permitted band of variation and is deactivated if the control deviation e exceeds a first threshold value, in the deactivated state, the control deviation e fed to the controller 4 is uninfluenced by the controller dead zone, and the controller dead zone element is reactivated once the control deviation e falls below a second threshold value that is smaller than the first threshold value, and in an activated state, and the control deviation e fed to the controller 4 is influenced by the controller dead zone.

Next, the disturbance variable d is measured and applied as an auxiliary manipulated variable u* to the manipulated variable u via a lowpass filter 10, as indicated in step 830.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A closed-loop control device for a process, said closed-loop control device being configured to influence the process via a manipulated variable in accordance with a control deviation between a reference value and a controlled variable affected by a disturbance variable, the closed-loop control device comprising:
   a controller which generates the manipulated variable from the control deviation fed to the controller;
   a controller dead zone element connected in front of the controller, said controller dead zone element being activated and deactivated by a control unit, and in an active state of which, the control deviation fed via the controller dead zone element being influenced by a controller dead zone, and in an inactive state being uninfluenced, and being deactivated if the control deviation exceeds a first threshold value, and being reactivated once the control deviation falls below a second threshold value which is smaller than the first threshold value; and
   an application element which contains a lowpass filter and a disturbance variable dead zone element arranged after the lowpass filter, said application element generating from the disturbance variable an auxiliary manipulated variable, which is applied to the manipulated variable.

2. The closed-loop control device as claimed in claim 1, further comprising:
   an additional control unit for controlling the disturbance variable dead zone element, said additional control unit comparing a current position of the disturbance variable dead zone with a lowpass-filtered disturbance variable or a deviation, and changes this position to a current value of the lowpass-filtered disturbance variable if the deviation exceeds a predetermined amount.

3. The closed-loop control device as claimed in claim 1, wherein the disturbance variable dead zone element is activated and deactivated by the additional control unit; wherein the control unit and further two control unit are coupled together; and wherein the additional control unit is configured to deactivate the disturbance variable dead zone element if the control deviation leaves the controller dead zone.

4. The closed-loop control device as claimed in claim 2, wherein the disturbance variable dead zone element is activated and deactivated by the additional control unit; wherein the control unit and further two control unit are coupled together; and wherein the additional control unit is configured to deactivate the disturbance variable dead zone element if the control deviation leaves the controller dead zone.

5. The closed-loop control device as claimed in claim 3, wherein the control unit is configured to deactivate the controller dead zone element if the lowpass-filtered disturbance variable leaves the disturbance variable dead zone.

6. A closed-loop control method for a process for regulating a controlled variable influenced by a disturbance variable to a reference value within a permitted band of variation, the method comprising:
   generating, by a controller, a manipulated variable from the control deviation which is fed to said controller;
   connecting a controller dead zone element in front of the controller, said controller dead zone element comprising a controller dead zone for defining the permitted band of variation and being deactivated if the control deviation exceeds a first threshold value, in the deactivated state, the control deviation fed to the controller being uninfluenced by the controller dead zone, and the controller dead zone element being reactivated once the control deviation falls below a second threshold value which is smaller than the first threshold value, and in an activated state, the control deviation fed to the controller being influenced by the controller dead zone; and
   measuring the disturbance variable and applying the disturbance variable as an auxiliary manipulated variable to the manipulated variable via a lowpass filter;
   wherein the measured and lowpass-filtered disturbance variable is fed to a disturbance variable dead zone element which outputs the auxiliary manipulated variable.

7. The closed-loop control method as claimed in claim 6, wherein a current position of the disturbance variable dead zone is compared with the lowpass-filtered disturbance variable for a deviation, said current position of the disturbance variable dead zone being changed to a current value of the lowpass-filtered disturbance variable if the deviation exceeds a predetermined amount.

8. The closed-loop control method as claimed in claim 6, wherein the disturbance variable dead zone element is deactivated if the control deviation leaves the controller dead zone in the controller dead zone element.

9. The closed-loop control method as claimed in claim 7, wherein the disturbance variable dead zone element is deactivated if the control deviation leaves the controller dead zone in the controller dead zone element.

10. The closed-loop control method as claimed in claim 8, wherein the controller dead zone element is deactivated if the lowpass-filtered disturbance variable leaves the disturbance variable dead zone in the disturbance variable dead zone element.

11. The closed-loop control method as claimed in claim 6, wherein in order to provide buffer-level control, a level measured in a buffer tank is utilized as the controlled variable, a measured intake into the buffer tank is utilized as the disturbance variable, and an outflow from the buffer tank is utilized as the manipulated variable.

12. The closed-loop control method as claimed in claim 6, wherein in order to provide regulation of a temperature of a process for processing or treating substances, the temperature of said process is controlled via at least one of (i) a heating jacket and (ii) a cooling jacket, a temperature measured in the process is utilized as the controlled variable, a substance intake is utilized as the disturbance variable, and a supply of at least one of (i) a heating agent and (ii) a cooling agent is utilized as the manipulated variable.

13. The closed-loop control method as claimed in claim 6, wherein in order to provide regulation of a substance quality at an output of a process for treating the substance by adding an additive, a quality parameter of the treated substance, which quality parameter is measured at the output of the process, is utilized as the controlled variable, an intake of an untreated substance is utilized as the disturbance variable, and a supply of the additive is utilized as the manipulated variable.

14. A computer program comprising program code instructions which are executable by a computer to implement the method as claimed in one of claim 6 when the computer program is executed on the computer.

15. A non-transitory computer program product which stores the computer program as claimed in claim 14 which is executable by the computer.

16. The non-transitory computer program product as claimed in claim 15, wherein the non-transitory computer program product comprises one of a data storage medium and a memory medium.

* * * * *